US012755184B2

(12) United States Patent
Takeori

(10) Patent No.: US 12,755,184 B2
(45) Date of Patent: Oct. 6, 2026

(54) GLOBAL QUANTUM OPTIMIZATION ALGORITHM FOR COMBINATORIAL OPTIMIZATION PROBLEMS IN NISQ DEVICES

(71) Applicant: International Business Machines Corporation, Armonk, NY (US)

(72) Inventor: Mitsuharu Takeori, Kashiwa (JP)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 18/104,720

(22) Filed: Feb. 1, 2023

(65) Prior Publication Data

US 2024/0265289 A1 Aug. 8, 2024

(51) Int. Cl.
*G06N 10/60* (2022.01)
*G06N 7/01* (2023.01)

(52) U.S. Cl.
CPC ............... *G06N 10/60* (2022.01); *G06N 7/01* (2023.01)

(58) Field of Classification Search
CPC ........ G06N 10/00; G06N 10/20; G06N 10/40; G06N 10/60; G06N 10/70; G06N 10/80;
(Continued)

(56) References Cited

U.S. PATENT DOCUMENTS 11,681,774 B1 * 6/2023 Wang ..................... G06N 10/60 708/553
11,989,256 B2 * 5/2024 Ronagh .................... G06N 5/01
(Continued)

FOREIGN PATENT DOCUMENTS

CA 3141547 A1 * 12/2020 ............... G06N 7/01
CA 3149305 A1 * 2/2021 ............ G06N 10/20
(Continued)

OTHER PUBLICATIONS

Takeori et al., "A Gauss-Newton Based Quantum Algorithm for Combinatorial Optimization," arXiv:2203.13939v4, Jun. 17, 2022, pp. 1-21.

(Continued)

*Primary Examiner* — Steven P Sax
(74) *Attorney, Agent, or Firm* — Samuel A. Waldbaum

(57) ABSTRACT

A method, system and computer program product for employing quantum optimization algorithms for combinatorial optimization problems in noisy intermediate-scale quantum (NISQ) devices. An objective function of a combinatorial optimization problem to be minimized is defined. The input to the objective function corresponds to the circuit parameters for the ansatz of the Gauss-Newton based quantum algorithm (GNQA). The output of the objective function corresponds to the error-robust indicator value indicating whether the result of GNQA (solution of the combinatorial optimization problem) is a legitimate or illegitimate return value. After initializing the circuit parameters (θ) of the objective function, GNQA is employed for local optimization. Furthermore, a Bayesian optimization is employed for global optimization in response to the solution of the combinatorial optimization problem not reaching a correct solution, where the Bayesian optimization updates the circuit parameters to minimize the indicator value. Once a correct solution is reached, it is outputted.

20 Claims, 5 Drawing Sheets

(58) Field of Classification Search
CPC .. G06N 3/08; G06N 5/04; G06N 7/01; G06N 20/00; G06N 3/094; G06N 3/045; G06N 3/0475; G06F 30/20; G06F 17/11; H04L 9/3263; H04L 9/3247; B07B 1/14; H04W 52/0216; G06Q 40/04; G06Q 30/0202
See application file for complete search history.

(56) References Cited

U.S. PATENT DOCUMENTS

| | | | | |
|---|---|---|---|---|
| 12,067,458 | B2 * | 8/2024 | Gonthier | G06F 15/16 |
| 12,475,401 | B2 * | 11/2025 | Amaro | G06N 10/80 |
| 2016/0004972 | A1 * | 1/2016 | Alboszta | G06Q 30/0202 |
| 2017/0139065 | A1 | 5/2017 | Gentilhomme et al. | |
| 2020/0104740 | A1 * | 4/2020 | Cao | G06N 10/60 |
| 2020/0372094 | A1 | 11/2020 | Shehab et al. | |
| 2020/0380196 | A1 * | 12/2020 | Zhang | G06F 30/20 |
| 2020/0394537 | A1 * | 12/2020 | Wang | G06N 5/04 |
| 2021/0133617 | A1 | 5/2021 | Sim | |
| 2021/0271731 | A1 * | 9/2021 | Stobinska | G06N 10/60 |
| 2021/0312313 | A1 * | 10/2021 | Woerner | G06F 17/11 |
| 2022/0147829 | A1 * | 5/2022 | Kubota | G06N 10/60 |
| 2022/0188679 | A1 * | 6/2022 | Mazzola | G06Q 40/04 |
| 2022/0326757 | A1 * | 10/2022 | Sydir | H04W 52/0216 |
| 2022/0374757 | A1 * | 11/2022 | Letourneau | G06F 30/20 |
| 2022/0383177 | A1 * | 12/2022 | Alcazar | G06N 10/60 |
| 2023/0081927 | A1 * | 3/2023 | Zhang | G06N 10/60 708/446 |
| 2023/0090148 | A1 * | 3/2023 | Gamble, IV | G06N 10/40 |
| 2023/0120932 | A1 * | 4/2023 | Parr | B07B 1/14 |
| 2024/0070508 | A1 * | 2/2024 | Park | G06N 10/40 |
| 2024/0220788 | A1 * | 7/2024 | Duong | G06N 3/08 |
| 2024/0273411 | A1 * | 8/2024 | Mueck | H04L 9/3263 |

FOREIGN PATENT DOCUMENTS

| | | | | | |
|---|---|---|---|---|---|
| CA | 3231785 | A1 | * | 3/2023 | G06Q 10/087 |
| CA | 3225821 | A1 | * | 5/2023 | G06N 10/20 |
| CA | 3238836 | A1 | * | 6/2023 | H02J 13/12 |
| CN | 114565021 | A | * | 5/2022 | G06N 3/044 |
| CN | 117677950 | A | * | 3/2024 | G06N 7/01 |
| CN | 119250218 | A | * | 1/2025 | B82Y 10/00 |
| EP | 4148631 | A1 | * | 3/2023 | G06N 10/40 |
| EP | 4220497 | A1 | * | 8/2023 | G06N 5/01 |
| EP | 3861486 | B1 | * | 10/2025 | G06F 17/11 |
| JP | 2023156102 | A | * | 10/2023 | |
| JP | 2023177389 | A | * | 12/2023 | G06N 3/0464 |
| JP | 2024500137 | A | * | 1/2024 | G06N 20/00 |
| WO | WO-2014210368 | A1 | * | 12/2014 | G06V 10/772 |
| WO | WO-2022256040 | A1 | * | 12/2022 | G06N 10/20 |
| WO | WO-2023014985 | A1 | * | 2/2023 | H04L 9/3247 |
| WO | WO-2023096968 | A1 | * | 6/2023 | G06N 3/08 |
| WO | WO-2023133189 | A1 | * | 7/2023 | G06N 10/60 |
| WO | WO-2024096767 | A1 | * | 5/2024 | G06F 30/398 |

OTHER PUBLICATIONS

Muller et al., "Accelerating Noise VQE Optimization with Gaussian Processes," arXiv:2204.07331v3, Aug. 3, 2022, pp. 1-11.

Willsch et al., "Benchmarking the Quantum Approximate Optimization Algorithm," Quantum Information Processing, vol. 19, No. 197, 2020, pp. 1-24.

* cited by examiner

GLOBAL QUANTUM OPTIMIZATION ALGORITHM FOR COMBINATORIAL OPTIMIZATION PROBLEMS IN NISQ DEVICES

TECHNICAL FIELD

The present disclosure relates generally to quantum optimization algorithms, and more particularly to implementing a global quantum optimization algorithm for combinatorial optimization problems that works effectively in noisy intermediate-scale quantum (NISQ) devices.

BACKGROUND

Quantum optimization algorithms are quantum algorithms that are used to solve optimization problems. Mathematical optimization deals with finding the best solution to a problem (according to some criteria) from a set of possible solutions. Mostly, the optimization problem is formulated as a minimization problem, where one tries to minimize an error which depends on the solution: the optimal solution has the minimal error. The power of quantum computing may allow problems which are not practically feasible on classical computers to be solved, or suggest a considerable speed up with respect to the best known classical algorithm.

SUMMARY

In one embodiment of the present disclosure, a method for employing quantum optimization algorithms for combinatorial optimization problems in noisy intermediate-scale quantum (NISQ) devices comprises defining an objective function of a combinatorial optimization problem to be minimized, where an input to the objective function corresponds to circuit parameters, and where an output of the objective function corresponds to an indicator value. The method further comprises initializing the circuit parameters of the objective function. The method additionally comprises employing a Gauss-Newton based quantum algorithm for local optimization to output the indicator value of the objective function based on the circuit parameters and to output a solution of the combinatorial optimization problem based on the circuit parameters. Furthermore, the method comprises employing Bayesian optimization for global optimization in response to the solution of the combinatorial optimization problem not reaching a correct solution, where the Bayesian optimization updates the circuit parameters to minimize the indicator value.

Other forms of the embodiment of the method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
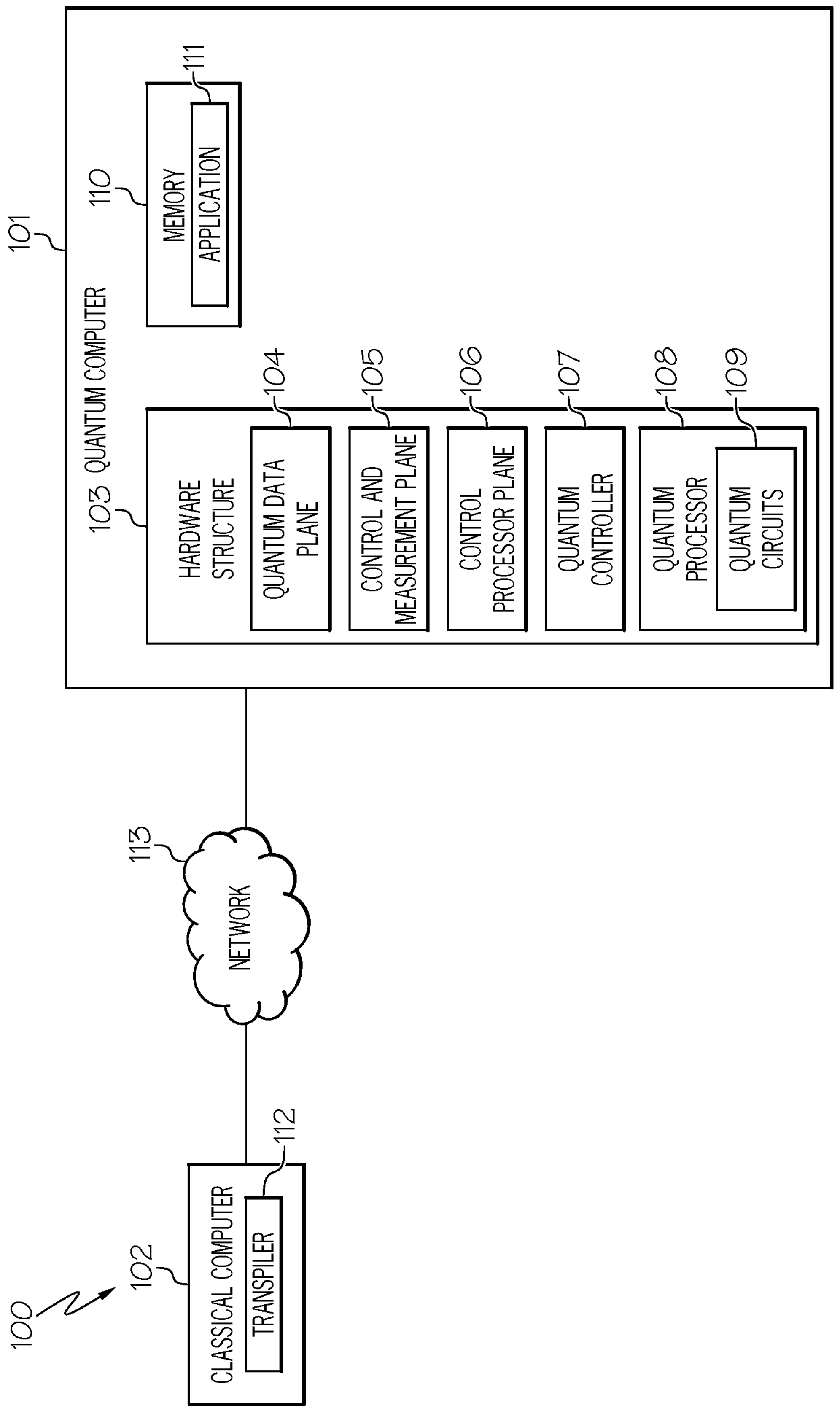
FIG. 1 illustrates a communication system for practicing the principles of the present disclosure in accordance with an embodiment of the present disclosure.

As stated in the Background section, quantum optimization algorithms are quantum algorithms that are used to solve optimization problems. Mathematical optimization deals with finding the best solution to a problem (according to some criteria) from a set of possible solutions. Mostly, the optimization problem is formulated as a minimization problem, where one tries to minimize an error which depends on the solution: the optimal solution has the minimal error. The power of quantum computing may allow problems which are not practically feasible on classical computers to be solved, or suggest a considerable speed up with respect to the best known classical algorithm.

One such optimization problem to be solved using a quantum optimization algorithm is a combinatorial optimization problem. The combinatorial optimization problem is the act of trying to find out the value (combination) of variables that optimizes an index (value) from among many options under various constraints. Examples of combinatorial optimization problems include the 2-Satisfiability (2-Sat) problem and the quadratic unconstrained binary optimization problem (QUBO).

The 2-Sat problem is a computational problem of assigning values to variables, each of which has two possible values, in order to satisfy a system of constraints on pairs of variables. It is a special case of the general Boolean satisfiability problem, which can involve constraints on more than two variables, and of constraint satisfaction problems, which can allow more than two choices for the value of each variable.

QUBO is a combinatorial optimization problem with a wide range of applications from finance and economics to machine learning. QUBO is a non-deterministic polynomial-time hardness (NP hard) problem, and for many classical problems from theoretical computer science, such as maximum cut, graph coloring and the partition problem, embeddings into QUBO have been formulated. Embeddings for machine learning models include support-vector machines, clustering and probabilistic graphical models. Moreover, due to its close connection to Ising models, QUBO constitutes a central problem class for adiabatic quantum computation, where it is solved through a physical process called quantum annealing.

In connection with solving combinatorial optimization problems, such as QUBO, a Gauss-Newton based quantum algorithm may be utilized to solve such a combinatorial optimization problem. Gauss-Newton based quantum algorithm (GNQA) is a quantum optimization algorithm that employs a parameter p, which bridges a gap between a gradient-method-based variational quantum eigensolver (VQE) and an exact search algorithm. The parameter p may correspond to the positive number for the Hamiltonian transformation, $f(H)=(1-H)^p$.

When the parameter p is large enough, GNQA, as a global optimization method, rapidly converges towards one of the optimal solutions without being trapped in local minima or plateaus. A global optimization method or algorithm is utilized to locate the global minima or maxima of a function or a set of functions on a given set. In function minimization (the task of finding the input to a mathematical function which produces the smallest output), the symptom of being too exploitative is getting stuck in a so called "local minima" where an early non-optimal result leads you down a path of no return from which you cannot improve. Plateaus refer to the situation in which whatever action is taken there is very little change in the result, with an apparent noisy or random component to all the observations.

In order for GNQA to perform as a global optimization algorithm, a deep quantum circuit (i.e., the depth or longest path of the quantum circuit is large) is required in order to realize the necessary Hamiltonian transformations in solving the combinatorial optimization problem, such as QUBO.

However, there is a limit to the depth of quantum circuits to execute stably since the computation on current noisy intermediate-scale quantum (NISQ) devices includes noise in the results.

Furthermore, when the parameter p is small, GNQA can be executed with shallow circuits (i.e., the depth or longest path of the quantum circuit is small) and is able to converge to the solution faster than standard VQEs. Unfortunately, when the parameter p is small, GNQA has the possibility of being trapped in local minima.

As a result, GNQA cannot currently be used as a valid global optimization algorithm to solve combinatorial optimization problems in the case of the parameter p being small, especially considering the usage of NISQ devices. That is, there is not currently a practical and stable global quantum optimization algorithm for combination optimization problems which works effectively in NISQ devices.

The embodiments of the present disclosure provide the means for implementing a global quantum optimization algorithm for combinatorial optimization problems that works effectively in NISQ devices. In one embodiment of the present disclosure, such a global quantum optimization algorithm for combinatorial optimization problems (e.g., QUBO) works effectively in NISQ devices by combining GNQA using a small value for the parameter p (e.g., p=5), which is executed with shallow circuits, along with the framework of a Bayesian optimization. In such an embodiment, GNQA is utilized for local optimization (locate the local minima for an objective function of a combinatorial optimization problem) and the Bayesian optimization is utilized for global optimization (locate the global minima for the objective function of the combinatorial optimization problem). In this manner, the Bayesian optimization framework is built on top of GNQA to realize the global optimization algorithm with slightly shallow circuits. As a result, a global quantum optimization algorithm for combinatorial optimization problems (e.g., QUBO), even in the case when the value of the parameter p is small (e.g., p<10) which is desirable in NISQ devices, can work effectively in NISQ devices. These and other features will be discussed in greater detail below.

In some embodiments of the present disclosure, the present disclosure comprises a method, system and computer program product for employing quantum optimization algorithms for combinatorial optimization problems in noisy intermediate-scale quantum (NISQ) devices. In one embodiment of the present disclosure, an objective function of a combinatorial optimization problem (e.g., quadratic unconstrained binary optimization problem (QUBO)) to be minimized is defined. In one embodiment, the input to the objective function corresponds to circuit parameters $$\theta \in \left[0, \frac{\pi}{2}\right]^N$$

for the ansatz of the Gauss-Newton based quantum algorithm (GNQA). An "ansantz," as used herein, refers to the initial guess to solve the combinatorial optimization problem. "N," as used herein, refers to the problem size of a target combinatorial optimization problem (e.g., QUBO), which is equal to the number of qubits for formulating the problem (e.g., QUBO) in quantum systems. In one embodiment, the output of the objective function corresponds to the error-robust indicator value defined by $g(x)=x^TQx$, where $g(x)$ is the error-robust indicator function which corresponds to a value indicating whether the result of GNQA (solution of the combinatorial optimization problem) is a legitimate return value or an illegitimate value that indicates an error, where Q is an upper triangular matrix for formulating a target combinatorial optimization problem (e.g., QUBO problem), $$\min_x x^T Qx,$$

and where x is a binary vector given by $$x = 1_{(0.5,1]}\left(\frac{1-\cos(2\theta_{result})}{2}\right)$$

and $\theta_{result}$ denotes the parameters obtained by GNQA. After initializing the circuit parameters ($\theta$) of the objective function, a Gauss-Newton based quantum algorithm (GNQA) is employed for local optimization (locating a local minima for the objective function) to output an error-robust estimation result (indicator value) of the objective function based on the circuit parameters as well as to output a solution of the combinatorial optimization problem (e.g., the ground state energy level of the Hamiltonian) based on the circuit parameters. Furthermore, a Bayesian optimization is employed for global optimization (locating a global minima for the objective function) in response to the solution of the combinatorial optimization problem not reaching a correct solution, where the Bayesian optimization updates the circuit parameters to minimize the error-robust estimation result (indicator value). Once a correct solution is reached, it is outputted. In this manner, the Bayesian optimization framework is built on top of GNQA to realize the global optimization algorithm with slightly shallow circuits. As a result, a global quantum optimization algorithm for combinatorial optimization problems (e.g., QUBO), even in the case when the value of the parameter p is small (e.g., p<10) which is desirable in NISQ devices, can work effectively in NISQ devices.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference and entanglement, as well as a classical computer 102 in which information is stored in bits that are represented logically by either a 0 (off) or a 1 (on). Examples of classical computer 102 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to setup the state of quantum bits in quantum computer 101 and then quantum computer 101 starts the quantum process. Furthermore, in one embodiment, classical computer 102 in conjunction with quantum computer 101 are configured to employ quantum optimization algorithms for combinatorial optimization problems (e.g., 2-Sat problem, QUBO) in NISQ devices as discussed further below.

In one embodiment, a hardware structure 103 of quantum computer 101 includes a quantum data plane 104, a control and measurement plane 105, a control processor plane 106, a quantum controller 107 and a quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gate, are all reversible. Examples of quantum logic gates include RX (performs $e^{i\theta X}$, which corresponds to a rotation of the qubit state around the X-axis by the given angle theta θ on the Bloch sphere), RY (performs $e^{i\theta Y}$, which corresponds to a rotation of the qubit state around the Y-axis by the given angle theta θ on the Bloch sphere), RXX (performs the operation $e^{(-i\theta/2X\oplus X)}$ on the input qubit), RZZ (takes in one input, an angle theta θ expressed in radians, and it acts on two qubits), etc. In one embodiment, quantum circuits 109 are written such that the horizontal axis is time, starting at the left hand side and ending at the right hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 includes memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for employing quantum optimization algorithms for combinatorial optimization problems in NISQ devices as discussed below in connection with FIGS. 2-3 and 4A-4B. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit® is an open-source software development kit for working with quantum computers at the level of circuits, pulses and algorithms) converts the trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to setup the state of quantum bits in quantum computer 101, may be connected to quantum computer 101 via a network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network and various combinations thereof. Other networks, whose descriptions are omitted here for brevity, may also be used in conjunction with system 100 of FIG. 1 without departing from the scope of the present disclosure.

Furthermore, classical computer 102 in conjunction with quantum computer 101 are configured to employ quantum optimization algorithms for combinatorial optimization problems (e.g., 2-Sat problem, QUBO) in NISQ devices as discussed further below in connection with FIGS. 2-3 and 4A-4B. A description of the software components of classical computer 102 is provided below in connection with FIG. 2 and a description of the hardware configuration of classical computer 102 is provided further below in connection with FIG. 3.

System 100 is not to be limited in scope to any one particular network architecture. System 100 may include any number of quantum computers 101, classical computers 102 and networks 113.

A discussion regarding the software components used by classical computer 102 for employing quantum optimization algorithms for combinatorial optimization problems (e.g., 2-Sat problem, QUBO) in NISQ devices is provided below in connection with FIG. 2.

Figure 2:
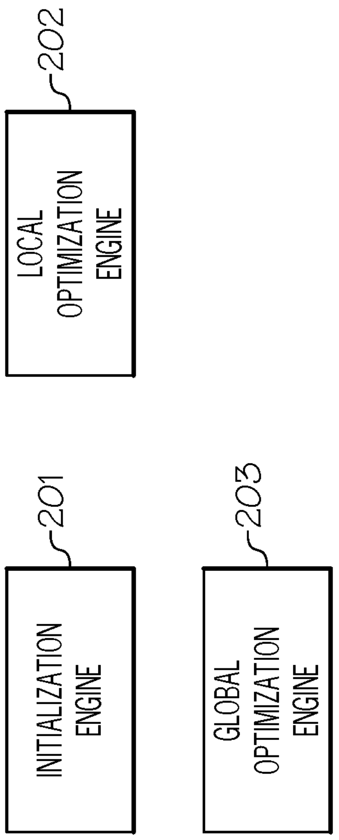
FIG. 2 is a diagram of the software components of the classical system for employing quantum optimization algorithms for combinatorial optimization problems in NISQ devices in accordance with an embodiment of the present disclosure.

FIG. 2 is a diagram of the software components of classical system 102 (FIG. 1) for employing quantum optimization algorithms for combinatorial optimization problems (e.g., 2-Sat problem, QUBO) in NISQ devices in accordance with an embodiment of the present disclosure.

Referring to FIG. 2, in conjunction with FIG. 1, classical computer 102 includes an initialization engine 201 configured to define an objective function of a combinatorial optimization problem (e.g., 2-Sat problem, QUBO) to be minimized.

In one embodiment, the objective function corresponds to finding the minimum value among a set of possible values calculated in solving the combinatorial optimization problem. In one embodiment, the objective function of the combinatorial optimization problem to be minimized is defined as having the following features.

In one embodiment, the input to the objective function corresponds to circuit parameters $$\theta \in \left[0, \frac{\pi}{2}\right]^N$$

for the ansatz of GNQA. An "ansantz," as used herein, refers to the initial guess to solve the combinatorial optimization problem. "N," as used herein, refers to the problem size of a target combinatorial optimization problem (e.g., QUBO), which is equal to the number of qubits for formulating the problem (e.g., QUBO) in quantum systems.

In one embodiment, the output of the objective function corresponds to the error-robust indicator value defined by $g(x)=x^TQx$, where g(x) is the error-robust indicator function which corresponds to a value indicating whether the result of GNQA (solution of combinatorial optimization problem) is a legitimate return value or an illegitimate value that indicates an error, where Q is an upper triangular matrix for formulating a target combinatorial optimization problem (e.g., QUBO problem), $$\min_x x^T Qx,$$

and where x is a binary vector given by $$x = 1_{(0.5,1]}\left(\frac{1-\cos(2\theta_{result})}{2}\right)$$

and where $\theta_{result}$ denotes the parameters obtained by GNQA.

In one embodiment, initialization engine 201 initializes the circuit parameters (θ) of the objective function. In one embodiment, initialization engine 201 initializes the circuit parameters (θ) of the objective function by randomly selecting such circuit parameters (θ) of the objective function.

Once initialized, initialization engine 201 prepares the state $|\varphi(\theta)\rangle$ using the initialized circuit parameters (θ) in the first trial (discussed further below) or the circuit parameters (θ) that were updated based on Bayesian optimization (discussed further below) in subsequent trials.

In one embodiment, such a state is prepared in connection with solving a combinatorial optimization problem, such as QUBO. QUBO is related and computationally equivalent to the Ising model. In particular, the generic formulation of QUBO corresponds to the Ising spin-glass Hamiltonian. As a result, in one embodiment, the prepared state $|\varphi(\theta)\rangle$ is utilized in the transformation of the Hamiltonian (discussed below). In one embodiment, given a guess or ansatz, quantum processor 108 calculates the expectation value of the system with respect to an observable, such as the Hamiltonian. The Hamiltonian of a system specifies its total energy—i.e., the sum of its kinetic energy (that of motion) and its potential energy (that of position)—in terms of the Lagrangian function and of the position and momentum of each of the particles. In one embodiment, quantum processor 108 executes quantum circuit 109 to perform the transformation of the Hamiltonian to realize:

$$U|\varphi\rangle \mapsto \frac{f(H)|\varphi\rangle}{\|f(H)|\varphi\rangle\|}$$

where H is the Hamiltonian converted from a target combinatorial optimization problem (e.g., QUBO), f(H) is the Hamiltonian transformation and U is the unitary operator acting on $|\varphi\rangle$.

In one embodiment, quantum processor 108 estimates all the inner products ($\langle\psi|\varphi\rangle$) upon execution of quantum circuit 109 to perform the transformation of the Hamiltonian. In one embodiment, quantum processor 108 performs the SWAP test to determine the inner products ($\langle\psi|\varphi\rangle$). The SWAP test is a procedure in quantum computation that is used to check how much two quantum states differ. In one embodiment, the SWAP test takes two input states $|\phi\rangle$ and $|\psi\rangle$ and outputs a Bernoulli random variable that is 1 with probability $$\frac{1}{2}-\frac{1}{2}|\langle\psi|\phi\rangle|^2$$

(where the expressions here use bra-ket notation). This allows one to, for example, estimate the squared inner product between the two states, $|\langle\psi|\phi\rangle|^2$ to ε additive error by taking the average over $$O\left(\frac{1}{\varepsilon^2}\right)$$

runs of the SWAP test. This requires $$O\left(\frac{1}{\varepsilon^2}\right)$$

copies of the input states. The squared inner product roughly measures "overlap" between the two states.

Classical computer 102 further includes local optimization engine 202 configured to perform local optimization. Local optimization, as used herein, refers to locating a local minima for the objective function. A local minima corresponds to the point in the domain of the function (e.g., objective function of a combinatorial optimization problem), which has the minimum value. In one embodiment, local optimization involves the steps discussed above (preparing the state $|\varphi(\theta)\rangle$ and having quantum computer 101 execute quantum circuit 109 to perform the transformation of the Hamiltonian to realize:

$$U|\varphi\rangle\mapsto\frac{f(H)|\varphi\rangle}{\|f(H)|\varphi\rangle\|}$$

and to estimate all the inner products ($\langle\psi|\phi\rangle$) as well as the steps discussed below performed by local optimization engine 202.

In one embodiment, local optimization engine 202 utilizes GNQA for local optimization to locate the local minima for an objective function of a combinatorial optimization problem (e.g., QUBO).

In one embodiment, local optimization engine 202 receives the inner products ($\langle\psi|\varphi\rangle$) of the transformation of the Hamiltonian. Upon receiving such inner products, local optimization engine 202 updates the circuit parameters (θ) based on the received inner products using GNQA. As discussed above, GNQA is a quantum optimization algorithm that employs a parameter p, which bridges a gap between a gradient-method-based variational quantum eigensolver (VQE) and an exact search algorithm. The parameter p may correspond to the positive number for the Hamiltonian transformation, $f(H)=(1-H)^P$. In another embodiment, for NISQ devices, the following Hamiltonian transformation, $f(H)=\exp(-p^2H^2)$, is utilized.

In one embodiment, the solution of the combinatorial optimization problem, such as QUBO, is to solve the problem:

$$\min_{\theta\in K}\frac{1}{2}\||\varphi(\theta)\rangle-|\xi^*\rangle\|^2,$$

where $|\xi\rangle$ is the ground state of H. The optimal solution may then be estimated in terms of parameters, such as circuit parameters (θ). In one embodiment, such circuit parameters (θ) are updated using the received inner products in connection with finding a solution to the combinatorial optimization problem.

In one embodiment, local optimization engine 202 employs GNQA for local optimization to output the solution of the combinatorial optimization problem (e.g., QUBO) as discussed above. In one embodiment, the solution of the combinatorial optimization problem corresponds to the ground state energy level of the Hamiltonian.

Furthermore, in addition to updating the circuit parameters (θ) using the estimated inner products of the transformation of the Hamiltonian based on GNQA, in one embodiment, local optimization engine 202 employs GNQA for local optimization to output an error-robust estimation result (indicator value) of the objective function based on the updated circuit parameters. As previously discussed, the output of the objective function corresponds to the error-robust indicator value defined by $g(x)=x^TQx$, where g(x) is the error-robust indicator function which corresponds to a value indicating whether the result of GNQA (solution of combinatorial optimization problem) is a legitimate return value or an illegitimate value that indicates an error, where Q is an upper triangular matrix for formulating a target combinatorial optimization problem (e.g., QUBO problem), $$\min_x x^TQx,$$

and where x is a binary vector given by $$x=1_{(0.5,1]}\left(\frac{1-\cos(2\theta_{result})}{2}\right)$$

and where $\theta_{result}$ denotes the parameters obtained by GNQA.

In one embodiment, the steps discussed above in connection with performing local optimization may be repeated based on whether the maximum number of iterations have been reached. If the maximum number of iterations has not yet been reached, then the process discussed above in performing local optimization is repeated.

Once the maximum number of iterations has been reached, a "trial" is said to occur. After each trial has been completed, including the first trial, a determination is made as to whether the correct solution has been reached. If not, a subsequent trial is performed involving updating the circuit parameters (θ) based on Bayesian optimization (discussed further below) in subsequent trials during a global optimization.

Global optimization, as used herein, refers to locating a global minima for the objective function. A global minima corresponds to the smallest overall value of a function (e.g., objective function of a combinatorial optimization problem) over its entire range.

Referring again to FIG. 2, classical computer 102 includes a global optimization engine 203 to determine if the correct solution has been reached. For example, global optimization engine 203 determines if the initial trial reaches the correct solution. That is, global optimization engine 203 determines if the solution of the combinatorial optimization problem provided by GNQA converges to a desired solution. For example, the solution of the combinatorial optimization problem provided by GNQA may correspond to the ground state energy level of the Hamiltonian. Such a solution may be said to reach a correct solution, when, as the iterations proceed, the output (ground state energy level of the Hamiltonian) gets closer and closer to a specific ground state energy level.

If a correct solution has not been reached, then global optimization engine 203 employs Bayesian optimization for global optimization, where the Bayesian optimization updates the circuit parameters (θ) to minimize the error-robust estimation result (indicator value corresponding to the output of the objective function of the combinatorial optimization problem). Bayesian optimization, as used herein, refers to a sequential design strategy for global optimization of black-box functions, such as the objective function of the combinatorial optimization problem, that does not assume any functional forms.

In one embodiment, the Bayesian optimization involves treating the objective function as a random function and place a prior (a prior probability distribution or "prior" of an uncertain quantity is the probability distribution, such as a probability distribution of circuit parameters (θ), that would express one's beliefs about this quantity before some evidence is taken into account over it) over it. The prior captures beliefs about the behavior of the function. After gathering the function evaluations, which are treated as data, the prior is updated to form the posterior distribution (distribution of circuit parameters (θ)) over the objective function. The posterior distribution, in turn, is used to construct an acquisition function (often also referred to as infill sampling criteria) that determines the next query point.

In one embodiment, the method of kriging, which uses Gaussian processes, is used to define the prior/posterior distribution (distribution of circuit parameters (θ)) over the objective function. Circuit parameters (θ) are then updated to minimize the variance among such a distribution. In one embodiment, the method Parzen-Tree Estimator is used to define the prior/posterior distribution (distribution of circuit parameters (θ)) over the objective function. In one embodiment, the Parzen-Tree Estimator constructs two distributions for "high" and "low" points and then finds the location that maximizes the expected improvement, which corresponds to updating the circuit parameters (θ) that minimizes the error-robust estimation result.

Upon updating the circuit parameters (θ), initialization engine 201 prepares the state $|\varphi(\theta)\rangle$ using the updated circuit parameters (θ) in a subsequent trial.

If, on the other hand, a correct solution has been reached, then global optimization engine 203 selects the solution of the combinatorial optimization problem outputted by the GNQA as the final solution.

In this manner, the Bayesian optimization framework is built on top of GNQA to realize the global optimization algorithm with slightly shallow circuits. As a result, a global quantum optimization algorithm for combinatorial optimization problems (e.g., QUBO), even in the case when the value of the parameter p is small (e.g., p<10) which is desirable in NISQ devices, can work effectively in NISQ devices.

A further description of these and other functions is provided below in connection with the discussion of the method for employing quantum optimization algorithms for combinatorial optimization problems in NISQ devices.

Prior to the discussion of the method for employing quantum optimization algorithms for combinatorial optimization problems in NISQ devices, a description of the hardware configuration of classical computer 102 (FIG. 1) is provided below in connection with FIG. 3.

Figure 3:
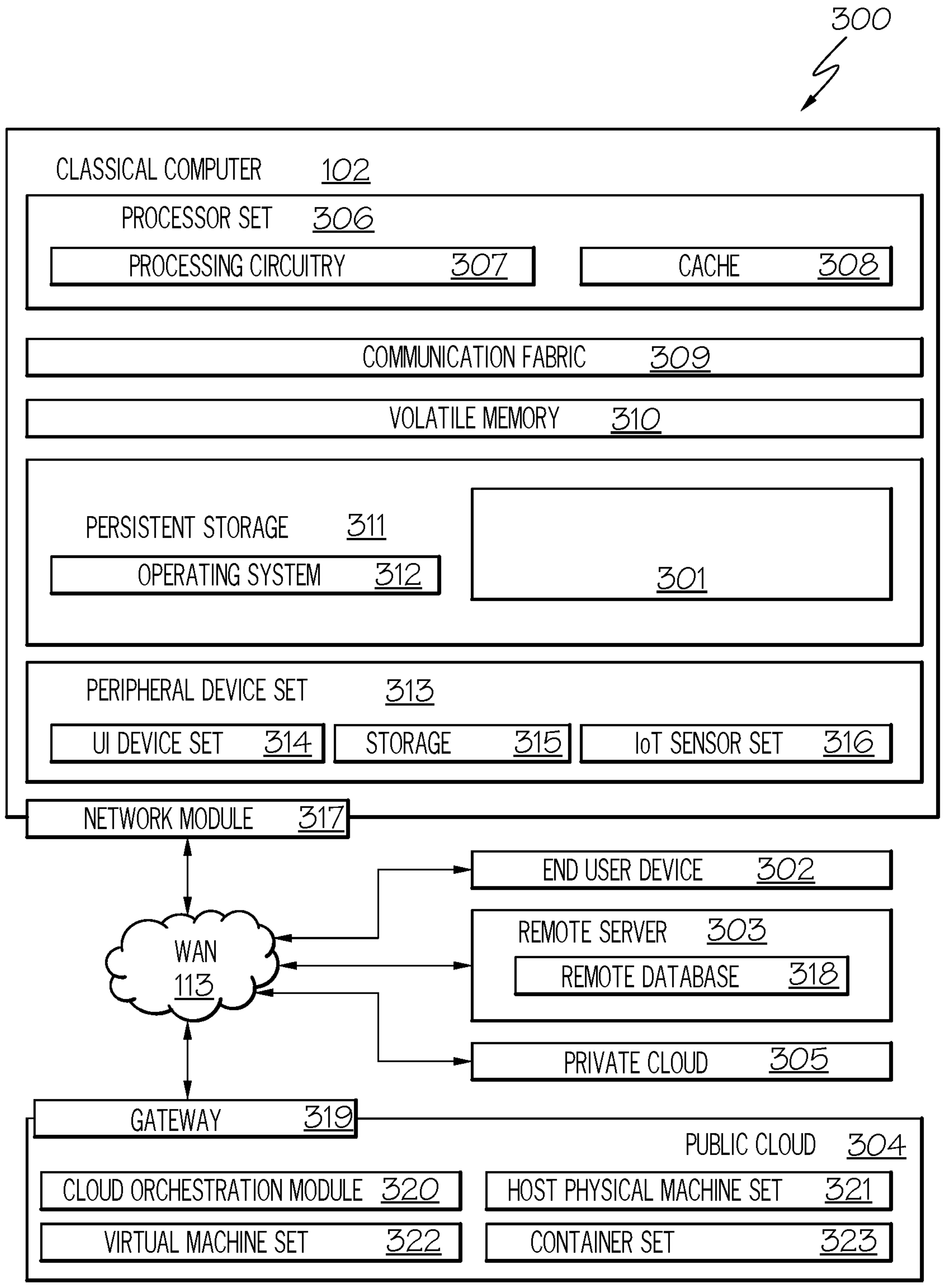
FIG. 3 illustrates an embodiment of the present disclosure of the hardware configuration of the classical computer which is representative of a hardware environment for practicing the present disclosure.

Referring now to FIG. 3, in conjunction with FIG. 1, FIG. 3 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code (stored in block 301) involved in performing the inventive methods, such as employing quantum optimization algorithms for combinatorial optimization problems in NISQ devices. In addition to block 301, computing environment 300 includes, for example, classical computer 102, network 113, such as a wide area network (WAN), end user device (EUD) 302, remote server 303, public cloud 304, and private cloud 305. In this embodiment, classical computer 102 includes processor set 306 (including processing circuitry 307 and cache 308), communication fabric 309, volatile memory 310, persistent storage 311 (including operating system 312 and block 301, as identified above), peripheral device set 313 (including user interface (UI) device set 314, storage 315, and Internet of Things (IoT) sensor set 316), and network module 317. Remote server 303 includes remote database 318. Public cloud 304 includes gateway 319, cloud orchestration module 320, host physical machine set 321, virtual machine set 322, and container set 323.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 318. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically classical computer 102, to keep the presentation as simple as possible. Classical computer 102 may be located in a cloud, even though it is not shown in a cloud in FIG. 3. On the other hand, classical computer 102 is not required to be in a cloud except to any extent as may be affirmatively indicated.

Processor set 306 includes one, or more, computer processors of any type now known or to be developed in the future. Processing circuitry 307 may be distributed over multiple packages, for example, multiple, coordinated integrated circuit chips. Processing circuitry 307 may implement multiple processor threads and/or multiple processor cores. Cache 308 is memory that is located in the processor chip package(s) and is typically used for data or code that should be available for rapid access by the threads or cores running on processor set 306. Cache memories are typically organized into multiple levels depending upon relative proximity to the processing circuitry. Alternatively, some, or all, of the cache for the processor set may be located “off chip.” In some computing environments, processor set 306 may be designed for working with qubits and performing quantum computing.

Computer readable program instructions are typically loaded onto classical computer 102 to cause a series of operational steps to be performed by processor set 306 of classical computer 102 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 308 and the other storage media discussed below. The program instructions, and associated data, are accessed by processor set 306 to control and direct performance of the inventive methods. In computing environment 300, at least some of the instructions for performing the inventive methods may be stored in block 301 in persistent storage 311.

Communication fabric 309 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 310 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 310 is located in a single package and is internal to classical computer 102, but, alternatively or additionally, the volatile memory may be distributed over multiple packages and/or located externally with respect to classical computer 102.

Persistent Storage 311 is any form of non-volatile storage for computers that is now known or to be developed in the future. The non-volatility of this storage means that the stored data is maintained regardless of whether power is being supplied to classical computer 102 and/or directly to persistent storage 311. Persistent storage 311 may be a read only memory (ROM), but typically at least a portion of the persistent storage allows writing of data, deletion of data and re-writing of data. Some familiar forms of persistent storage include magnetic disks and solid state storage devices. Operating system 312 may take several forms, such as various known proprietary operating systems or open source Portable Operating System Interface type operating systems that employ a kernel. The code included in block 301 typically includes at least some of the computer code involved in performing the inventive methods.

Peripheral device set 313 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 314 may include components such as a display screen, speaker, microphone, wearable devices (such as goggles and smart watches), keyboard, mouse, printer, touchpad, game controllers, and haptic devices. Storage 315 is external storage, such as an external hard drive, or insertable storage, such as an SD card. Storage 315 may be persistent and/or volatile. In some embodiments, storage 315 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 316 is made up of sensors that can be used in Internet of Things applications. For example, one sensor may be a thermometer and another sensor may be a motion detector.

Network module 317 is the collection of computer software, hardware, and firmware that allows classical computer 102 to communicate with other computers through WAN 113. Network module 317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 317 are performed on the same physical hardware device. In other embodiments (for example, embodiments that utilize software-defined networking (SDN)), the control functions and the forwarding functions of network module 317 are performed on physically separate devices, such that the control functions manage several different network hardware devices. Computer readable program instructions for performing the inventive methods can typically be downloaded to classical computer 102 from an external computer or external storage device through a network adapter card or network interface included in network module 317.

WAN 113 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 302 is any computer system that is used and controlled by an end user (for example, a customer of an enterprise that operates classical computer 102), and may take any of the forms discussed above in connection with classical computer 102. EUD 302 typically receives helpful and useful data from the operations of classical computer 102. For example, in a hypothetical case where classical computer 102 is designed to provide a recommendation to an end user, this recommendation would typically be communicated from network module 317 of classical computer 102 through WAN 113 to EUD 302. In this way, EUD 302 can display, or otherwise present, the recommendation to an end user. In some embodiments, EUD 302 may be a client device, such as thin client, heavy client, mainframe computer, desktop computer and so on.

Remote server 303 is any computer system that serves at least some data and/or functionality to classical computer 102. Remote server 303 may be controlled and used by the same entity that operates classical computer 102. Remote server 303 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 318 of remote server 303.

Public cloud 304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 304 is performed by the computer hardware and/or software of cloud orchestration module 320. The computing resources provided by public cloud 304 are typically implemented by virtual computing environments that run on various computers making up the computers of host physical machine set 321, which is the universe of physical computers in and/or available to public cloud 304. The virtual computing environments (VCEs) typically take the form of virtual machines from virtual machine set 322 and/or containers from container set 323. It is understood that these VCEs may be stored as images and may be transferred among and between the various physical machine hosts, either as images or after instantiation of the VCE. Cloud orchestration module 320 manages the transfer and storage of images, deploys new instantiations of VCEs and manages active instantiations of VCE deployments. Gateway 319 is the collection of computer software, hardware, and firmware that allows public cloud 304 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 305 is similar to public cloud 304, except that the computing resources are only available for use by a single enterprise. While private cloud 305 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 304 and private cloud 305 are both part of a larger hybrid cloud.

Block 301 further includes the software components discussed above in connection with FIG. 2 to employ quantum optimization algorithms for combinatorial optimization problems in NISQ devices. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for employing quantum optimization algorithms for combinatorial optimization problems in NISQ devices, may be embodied in an application specific integrated circuit.

As stated above, in connection with solving combinatorial optimization problems, such as QUBO, a Gauss-Newton based quantum algorithm may be utilized to solve such a combinatorial optimization problem. Gauss-Newton based quantum algorithm (GNQA) is a quantum optimization algorithm that employs a parameter p, which bridges a gap between a gradient-method-based variational quantum eigensolver (VQE) and an exact search algorithm. The parameter p may correspond to the positive number for the Hamiltonian transformation, $f(H)=(1-H)^p$. When the parameter p is large enough, GNQA, as a global optimization method, rapidly converges towards one of the optimal solutions without being trapped in local minima or plateaus. A global optimization method or algorithm is utilized to locate the global minima or maxima of a function or a set of functions on a given set. In function minimization (the task of finding the input to a mathematical function which produces the smallest output), the symptom of being too exploitative is getting stuck in a so called "local minima" where an early non-optimal result leads you down a path of no return from which you cannot improve. Plateaus refer to the situation in which whatever action is taken there is very little change in the result, with an apparent noisy or random component to all the observations. In order for GNQA to perform as a global optimization algorithm, a deep quantum circuit (i.e., the depth or longest path of the quantum circuit is large) is required in order to realize the necessary Hamiltonian transformations in solving the combinatorial optimization problem, such as QUBO. However, there is a limit to the depth of quantum circuits to execute stably since the computation on current noisy intermediate-scale quantum (NISQ) devices includes noise in the results. Furthermore, when the parameter p is small, GNQA can be executed with shallow circuits (i.e., the depth or longest path of the quantum circuit is small) and is able to converge to the solution faster than standard VQEs. Unfortunately, when the parameter p is small, GNQA has the possibility of being trapped in local minima. As a result, GNQA cannot currently be used as a valid global optimization algorithm to solve combinatorial optimization problems in the case of the parameter p being small, especially considering the usage of NISQ devices. That is, there is not currently a practical and stable global quantum optimization algorithm for combination optimization problems which works effectively in NISQ devices.

The embodiments of the present disclosure provide the means for implementing a global quantum optimization algorithm for combinatorial optimization problems that works effectively in NISQ devices by combining GNQA using a small value for the parameter p (e.g., p=5), which is executed with shallow circuits, along with the framework of Bayesian optimization as discussed below in connection with FIGS. 4A-4B.

Figure 4A:
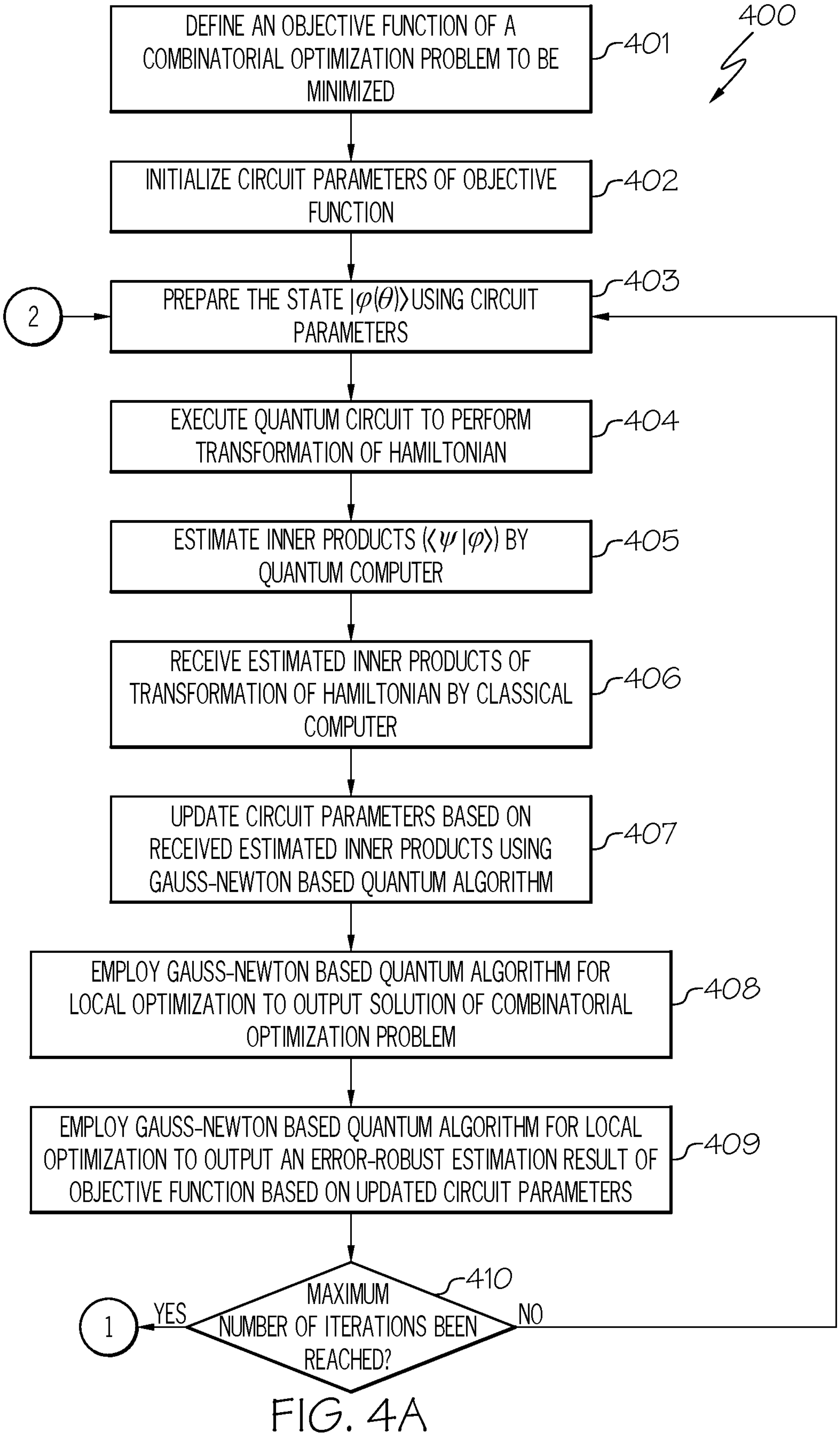
FIGS. 4A-4B are a flowchart of a method for employing quantum optimization algorithms for combinatorial optimization problems in NISQ devices in accordance with an embodiment of the present disclosure.
Figure 4B:
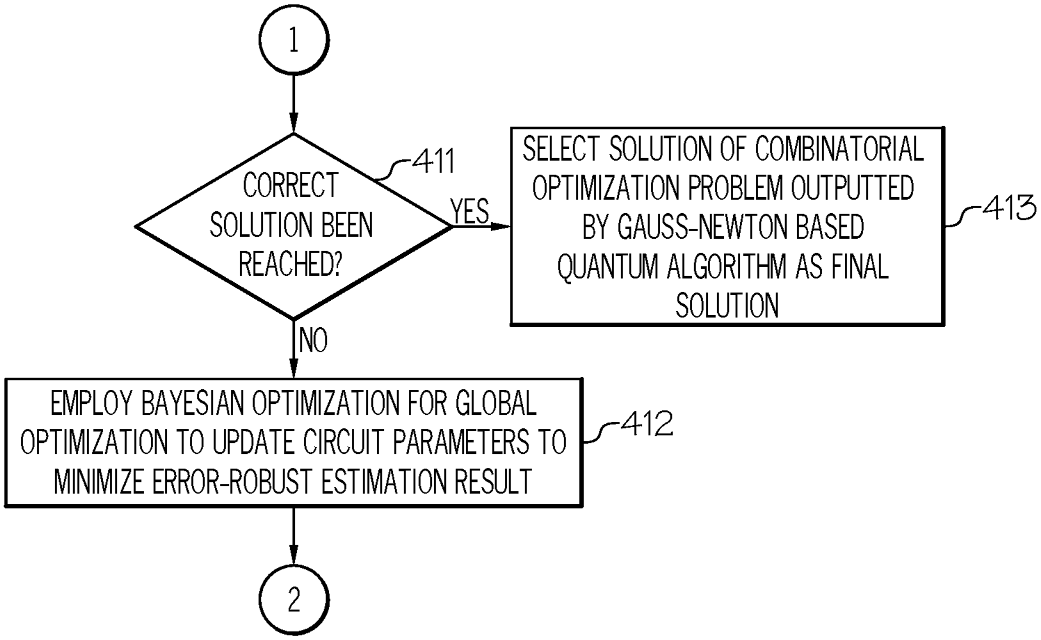

FIGS. 4A-4B are a flowchart of a method 400 for employing quantum optimization algorithms for combinatorial optimization problems in NISQ devices in accordance with an embodiment of the present disclosure.

Referring to FIG. 4A, in conjunction with FIGS. 1-3, in step 401, initialization engine 201 of classical computer 102 defines an objective function of a combinatorial optimization problem (e.g., 2-Sat problem, QUBO) to be minimized.

As discussed above, in one embodiment, the objective function corresponds to finding the minimum value among a set of possible values calculated in solving the combinatorial optimization problem. In one embodiment, the objective function of the combinatorial optimization problem to be minimized is defined as having the following features.

In one embodiment, the input to the objective function corresponds to circuit parameters $$\theta \in \left[0, \frac{\pi}{2}\right]^N$$

for the ansatz of GNQA. An "ansantz," as used herein, refers to the initial guess to solve the combinatorial optimization problem. "N," as used herein, refers to the problem size of a target combinatorial optimization problem (e.g., QUBO), which is equal to the number of qubits for formulating the problem (e.g., QUBO) in quantum systems.

In one embodiment, the output of the objective function corresponds to the error-robust indicator value defined by $g(x)=x^TQx$, where g(x) is the error-robust indicator function which corresponds to a value indicating whether the result of GNQA (solution of combinatorial optimization problem) is a legitimate return value or an illegitimate value that indicates an error, where Q is an upper triangular matrix for formulating a target combinatorial optimization problem (e.g., QUBO problem), $$\min_x x^T Qx,$$

and where x is a binary vector given by $$x = 1_{(0.5,1]}\left(\frac{1-\cos(2\theta_{result})}{2}\right)$$

and where $\theta_{result}$ denotes the parameters obtained by GNQA.

In step 402, initialization engine 201 of classical computer 102 initializes the circuit parameters (θ) of the objective function.

As stated above, in one embodiment, initialization engine 201 initializes the circuit parameters (θ) of the objective function by randomly selecting such circuit parameters (θ) of the objective function.

In step 403, initialization engine 201 of classical computer 102 prepares the state $|\varphi(\theta)\rangle$ using the initialized circuit parameters (θ) in the first trial or the circuit parameters (θ) that were updated based on Bayesian optimization in subsequent trials.

As discussed above, in one embodiment, such a state is prepared in connection with solving a combinatorial optimization problem, such as QUBO. QUBO is related and computationally equivalent to the Ising model. In particular, the generic formulation of QUBO corresponds to the Ising spin-glass Hamiltonian. As a result, in one embodiment, the prepared state $|\varphi(\theta)\rangle$ is utilized in the transformation of the Hamiltonian. In one embodiment, given a guess or ansatz, quantum processor 108 calculates the expectation value of the system with respect to an observable, such as the Hamiltonian. The Hamiltonian of a system specifies its total energy—i.e., the sum of its kinetic energy (that of motion) and its potential energy (that of position)—in terms of the Lagrangian function and of the position and momentum of each of the particles.

In step 404, quantum processor 108 of quantum computer 101 executes quantum circuit 109 to perform the transformation of the Hamiltonian to realize:

$$U|\varphi\rangle \mapsto \frac{f(H)|\varphi\rangle}{\|f(H)|\varphi\rangle\|}$$

where H is the Hamiltonian converted from a target combinatorial optimization problem (e.g., QUBO), f(H) is the Hamiltonian transformation and U is the unitary operator acting on $|\varphi\rangle$.

In step 405, quantum processor 108 of quantum computer 101 estimates all the inner products (⟨ψ|φ⟩) upon execution of quantum circuit 109 to perform the transformation of the Hamiltonian.

As stated above, in one embodiment, quantum processor 108 performs the SWAP test to determine the inner products (⟨ψ|φ⟩). The SWAP test is a procedure in quantum computation that is used to check how much two quantum states differ. In one embodiment, the SWAP test takes two input states |ϕ⟩ and |ψ! and outputs a Bernoulli random variable that is 1 with probability $$\frac{1}{2}-\frac{1}{2}|\langle\psi|\phi\rangle|^2$$

(where the expressions here use bra-ket notation). This allows one to, for example, estimate the squared inner product between the two states, $|\langle\psi|\phi\rangle|^2$ to ε additive error by taking the average over $$O\left(\frac{1}{\varepsilon^2}\right)$$

runs of the SWAP test. This requires $$O\left(\frac{1}{\varepsilon^2}\right)$$

copies of the input states. The squared inner product roughly measures "overlap" between the two states.

In step 406, local optimization engine 202 of classical computer 102 receives the estimated inner products (⟨ψ|φ⟩) of the transformation of the Hamiltonian (obtained in step 405).

In step 407, local optimization engine 202 of classical computer 102 updates the circuit parameters (θ) based on the received inner products using GNQA.

As discussed above, GNQA is a quantum optimization algorithm that employs a parameter p, which bridges a gap between a gradient-method-based variational quantum eigensolver (VQE) and an exact search algorithm. The parameter p may correspond to the positive number for the Hamiltonian transformation, $f(H)=(1-H)^P$. In another embodiment, for NISQ devices, the following Hamiltonian transformation, $f(H)\ \exp(-p^2H^2)$, is utilized.

In one embodiment, the solution of the combinatorial optimization problem, such as QUBO, is to solve the problem:

$$\min_{\theta\in K}\frac{1}{2}\||\varphi(\theta)\rangle-|\xi^*\rangle\|^2,$$

|ξ⟩, where is the ground state of H. The optimal solution may then be estimated in terms of parameters, such as circuit parameters (θ). In one embodiment, such circuit parameters (θ) are updated using the received inner products in connection with finding a solution to the combinatorial. optimization problem.

In step 408, local optimization engine 202 of classical computer 102 employs GNQA for local optimization to output the solution the combinatorial problem as discussed above.

As stated above, in one embodiment, the solution of the combinatorial optimization problem corresponds to the ground state energy level of the Hamiltonian.

In step 409, local optimization engine 202 of classical computer 102 employs GNQA for local optimization to output an error-robust estimation result (indicator value) of the objective function based on the updated circuit parameters. As previously discussed, the output of the objective function corresponds to the error-robust indicator value defined by $g(x)=x^TQx$, where g(x) is the error-robust indicator function which corresponds to a value indicating whether the result of GNQA (solution of combinatorial optimization problem) is a legitimate return value or an illegitimate value that indicates an error, where Q is an upper triangular matrix for formulating a target combinatorial optimization problem (e.g., QUBO problem), $$\min_x x^TQx,$$

and where x is a binary vector given by $$x=1_{(0.5,1]}\left(\frac{1-\cos(2\theta_{result})}{2}\right)$$

and where $\theta_{result}$ denotes the parameters obtained by GNQA.

In step 410, local optimization engine 202 of classical computer 102 determines whether a maximum number of iterations has been reached.

In one embodiment, the steps discussed above in connection with performing local optimization (e.g., steps 403-409) may be repeated based on whether the maximum number of iterations have been reached. If the maximum number of iterations has not yet been reached, then initialization engine 201 of classical computer 102 prepares the state |φ(θ)⟩ using the circuit ⟩ parameters (θ) previously utilized in step 403.

Referring to FIG. 4B, in conjunction with FIGS. 1-3, once the maximum number of iterations has been reached, a "trial" is said to occur. After each trial has been completed, including the first trial, in step 411, global optimization engine 203 of classical computer 102 determines whether the correct solution has been reached. If not, a subsequent trial is performed involving updating the circuit parameters (θ) based on the Bayesian optimization in subsequent trials during a global optimization.

For example, global optimization engine 203 determines if the initial trial reaches the correct solution. That is, global optimization engine 203 determines if the solution of the combinatorial optimization problem provided by GNQA converges to a desired solution. For example, the solution of the combinatorial optimization problem provided by GNQA may correspond to the ground state energy level of the Hamiltonian. Such a solution may be said to reach a correct solution, when, as the iterations proceed, the output (ground state energy level of the Hamiltonian) gets closer and closer to a specific ground state energy level.

If a correct solution has not been reached, then, in step 412, global optimization engine 203 of classical computer 102 employs Bayesian optimization for global optimization, where the Bayesian optimization updates the circuit parameters (θ) to minimize the error-robust estimation result (indicator value corresponding to the output of the objective function of the combinatorial optimization problem).

As discussed above, Bayesian optimization, as used herein, refers to a sequential design strategy for global optimization of black-box functions, such as the objective function of the combinatorial optimization problem, that does not assume any functional forms.

In one embodiment, the Bayesian optimization involves treating the objective function as a random function and place a prior (a prior probability distribution or "prior" of an uncertain quantity is the probability distribution, such as a probability distribution of circuit parameters (θ), that would express one's beliefs about this quantity before some evidence is taken into account over it) over it. The prior captures beliefs about the behavior of the function. After gathering the function evaluations, which are treated as data, the prior is updated to form the posterior distribution (distribution of circuit parameters (θ)) over the objective function. The posterior distribution, in turn, is used to construct an acquisition function (often also referred to as infill sampling criteria) that determines the next query point.

In one embodiment, the method of kriging, which uses Gaussian processes, is used to define the prior/posterior distribution (distribution of circuit parameters (θ)) over the objective function. Circuit parameters (θ) are then updated to minimize the variance among such a distribution. In one embodiment, the method Parzen-Tree Estimator is used to define the prior/posterior distribution (distribution of circuit parameters (θ)) over the objective function. In one embodiment, the Parzen-Tree Estimator constructs two distributions for "high" and "low" points and then finds the location that maximizes the expected improvement, which corresponds to updating the circuit parameters (θ) that minimizes the error-robust estimation result.

Upon updating the circuit parameters (θ), initialization engine 201 of classical computer 102 prepares the state $|\varphi(\theta)\rangle$ using the updated circuit parameters (θ) in a subsequent trial in step 403.

Referring to step 411, if, however, a correct solution has been reached, then, in step 413, global optimization engine 203 of classical computer 102 selects the solution of the combinatorial optimization problem outputted by the GNQA as the final solution.

In this manner, the Bayesian optimization framework is built on top of GNQA to realize the global optimization algorithm with slightly shallow circuits. As a result, a global quantum optimization algorithm for combinatorial optimization problems (e.g., QUBO), even in the case when the value of the parameter p is small (e.g., p<10) which is desirable in NISQ devices, can work effectively in NISQ devices.

As a result of the foregoing, the principles of the present disclosure provide a means for enabling GNQA to be used as a valid global optimization algorithm to solve combinatorial optimization problems in the case of the parameter p being small (e.g., p<10) in NISQ devices. In one embodiment, such an optimization algorithm is implemented using a classical-quantum hybrid global optimization method. Iterative trials are implemented in the classical-quantum hybrid system. In one trial, the process is executed by the Gauss-Newton-based quantum optimization, where the circuit parameters are input and the error-robust estimation result of the objective function is output. If the initial trial does not reach the correct solution, then a subsequent trial will be performed by replacing the initial parameters with the ones searched by the Bayesian optimization. Once the correct solution is reached, it is outputted. In this manner, the Bayesian optimization framework is built on top of GNQA to realize the global optimization algorithm with slightly shallow circuits.

Furthermore, the principles of the present disclosure improve the technology or technical field involving quantum optimization algorithms.

As discussed above, in connection with solving combinatorial optimization problems, such as QUBO, a Gauss-Newton based quantum algorithm may be utilized to solve such a combinatorial optimization problem. Gauss-Newton based quantum algorithm (GNQA) is a quantum optimization algorithm that employs a parameter p, which bridges a gap between a gradient-method-based variational quantum eigensolver (VQE) and an exact search algorithm. The parameter p may correspond to the positive number for the Hamiltonian transformation, $f(H)=(1-H)^p$. When the parameter p is large enough, GNQA, as a global optimization method, rapidly converges towards one of the optimal solutions without being trapped in local minima or plateaus. A global optimization method or algorithm is utilized to locate the global minima or maxima of a function or a set of functions on a given set. In function minimization (the task of finding the input to a mathematical function which produces the smallest output), the symptom of being too exploitative is getting stuck in a so called "local minima" where an early non-optimal result leads you down a path of no return from which you cannot improve. Plateaus refer to the situation in which whatever action is taken there is very little change in the result, with an apparent noisy or random component to all the observations. In order for GNQA to perform as a global optimization algorithm, a deep quantum circuit (i.e., the depth or longest path of the quantum circuit is large) is required in order to realize the necessary Hamiltonian transformations in solving the combinatorial optimization problem, such as QUBO. However, there is a limit to the depth of quantum circuits to execute stably since the computation on current noisy intermediate-scale quantum (NISQ) devices includes noise in the results. Furthermore, when the parameter p is small, GNQA can be executed with shallow circuits (i.e., the depth or longest path of the quantum circuit is small) and is able to converge to the solution faster than standard VQEs. Unfortunately, when the parameter p is small, GNQA has the possibility of being trapped in local minima. As a result, GNQA cannot currently be used as a valid global optimization algorithm to solve combinatorial optimization problems in the case of the parameter p being small, especially considering the usage of NISQ devices. That is, there is not currently a practical and stable global quantum optimization algorithm for combination optimization problems which works effectively in NISQ devices.

Embodiments of the present disclosure improve such technology by defining an objective function of a combinatorial optimization problem (e.g., quadratic unconstrained binary optimization problem (QUBO)) to be minimized. In one embodiment, the input to the objective function corresponds to circuit parameters $$\theta \in \left[0, \frac{\pi}{2}\right]^N$$

for the ansatz of the Gauss-Newton based quantum algorithm (GNQA). An "ansantz," as used herein, refers to the initial guess to solve the combinatorial optimization problem. "N," as used herein, refers to the problem size of a target combinatorial optimization problem (e.g., QUBO), which is equal to the number of qubits for formulating the problem (e.g., QUBO) in quantum systems. In one embodiment, the output of the objective function corresponds to the error-robust indicator value defined by $g(x)=x^TQx$, where g(x) is the error-robust indicator function which corresponds to a value indicating whether the result of GNQA (solution of the combinatorial optimization problem) is a legitimate return value or an illegitimate value that indicates an error, where Q is an upper triangular matrix for formulating a target combinatorial optimization problem (e.g., QUBO problem), $$\min_x x^T Qx,$$

and where x is a binary vector given by $$x = 1_{(0.5,1]}\left(\frac{1-\cos(2\theta_{result})}{2}\right)$$

and $\theta_{result}$ denotes the parameters obtained by GNQA. After initializing the circuit parameters (θ) of the objective function, a Gauss-Newton based quantum algorithm (GNQA) is employed for local optimization (locating a local minima for the objective function) to output an error-robust estimation result (indicator value) of the objective function based on the circuit parameters as well as to output a solution of the combinatorial optimization problem (e.g., the ground state energy level of the Hamiltonian) based on the circuit parameters. Furthermore, a Bayesian optimization is employed for global optimization (locating a global minima for the objective function) in response to the solution of the combinatorial optimization problem not reaching a correct solution, where the Bayesian optimization updates the circuit parameters to minimize the error-robust estimation result (indicator value). Once a correct solution is reached, it is outputted. In this manner, the Bayesian optimization framework is built on top of GNQA to realize the global optimization algorithm with slightly shallow circuits. As a result, a global quantum optimization algorithm for combinatorial optimization problems (e.g., QUBO), even in the case when the value of the parameter p is small (e.g., $p<10$) which is desirable in NISQ devices, can work effectively in NISQ devices. Furthermore, in this manner, there is an improvement in the technical field involving quantum optimization algorithms.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for employing quantum optimization algorithms for combinatorial optimization problems in noisy intermediate-scale quantum (NISQ) devices, the method comprising:

defining a non-linear objective function of a combinatorial optimization problem to be minimized, wherein an input to said objective function corresponds to circuit parameters, wherein an output of said objective function corresponds to an indicator value;

initializing said circuit parameters of said objective function;

employing a Gauss-Newton based quantum algorithm for local optimization to output said indicator value of said objective function based on said circuit parameters and to output a solution of said combinatorial optimization problem based on said circuit parameters; and employing Bayesian optimization for global optimization in response to said solution of said combinatorial optimization problem not reaching a correct solution, wherein said Bayesian optimization updates said circuit parameters to minimize said indicator value.

2. The method as recited in claim 1 further comprising:

selecting said solution of said combinatorial optimization problem outputted by said Gauss-Newton based quantum algorithm as a final solution in response to said solution of said combinatorial optimization problem reaching said correct solution.

3. The method as recited in claim 1 further comprising:

receiving an estimated inner products of a transformation of a Hamiltonian performed by a quantum computing system.

4. The method as recited in claim 3 further comprising:

updating said circuit parameters using said estimated inner products of said transformation of said Hamiltonian using said Gauss-Newton based quantum algorithm.

5. The method as recited in claim 4 further comprising:

outputting said solution of said combinatorial optimization problem by said Gauss-Newton based quantum algorithm using said updated circuit parameters.

6. The method as recited in claim 5, wherein said solution of said combinatorial optimization problem comprises a ground state energy level of said Hamiltonian.

7. The method as recited in claim 1, wherein said combinatorial optimization problem corresponds to a quadratic unconstrained binary optimization problem.

8. A computer program product for employing quantum optimization algorithms for combinatorial optimization problems in noisy intermediate-scale quantum (NISQ) devices, the computer program product comprising one or more computer readable storage mediums having program code embodied therewith, the program code comprising programming instructions for:

defining a non-linear objective function of a combinatorial optimization problem to be minimized, wherein an input to said objective function corresponds to circuit parameters, wherein an output of said objective function corresponds to an indicator value;

initializing said circuit parameters of said objective function;

employing a Gauss-Newton based quantum algorithm for local optimization to output said indicator value of said objective function based on said circuit parameters and to output a solution of said combinatorial optimization problem based on said circuit parameters; and employing Bayesian optimization for global optimization in response to said solution of said combinatorial optimization problem not reaching a correct solution, wherein said Bayesian optimization updates said circuit parameters to minimize said indicator value.

9. The computer program product as recited in claim 8, wherein the program code further comprises the programming instructions for:

selecting said solution of said combinatorial optimization problem outputted by said Gauss-Newton based quantum algorithm as a final solution in response to said solution of said combinatorial optimization problem reaching said correct solution.

10. The computer program product as recited in claim 8, wherein the program code further comprises the programming instructions for:

receiving an estimated inner products of a transformation of a Hamiltonian performed by a quantum computing system.

11. The computer program product as recited in claim 10, wherein the program code further comprises the programming instructions for:

updating said circuit parameters using said estimated inner products of said transformation of said Hamiltonian using said Gauss-Newton based quantum algorithm.

12. The computer program product as recited in claim 11, wherein the program code further comprises the programming instructions for:

outputting said solution of said combinatorial optimization problem by said Gauss-Newton based quantum algorithm using said updated circuit parameters.

13. The computer program product as recited in claim 12, wherein said solution of said combinatorial optimization problem comprises a ground state energy level of said Hamiltonian.

14. The computer program product as recited in claim 8, wherein said combinatorial optimization problem corresponds to a quadratic unconstrained binary optimization problem.

15. A system, comprising:

a memory for storing a computer program for employing quantum optimization algorithms for combinatorial optimization problems in noisy intermediate-scale quantum (NISQ) devices; and a processor connected to said memory, wherein said processor is configured to execute program instructions of the computer program comprising:

defining a non-linear objective function of a combinatorial optimization problem to be minimized, wherein an input to said objective function corresponds to circuit parameters, wherein an output of said objective function corresponds to an indicator value;

initializing said circuit parameters of said objective function;

employing a Gauss-Newton based quantum algorithm for local optimization to output said indicator value of said objective function based on said circuit parameters and to output a solution of said combinatorial optimization problem based on said circuit parameters; and employing Bayesian optimization for global optimization in response to said solution of said combinatorial optimization problem not reaching a correct solution, wherein said Bayesian optimization updates said circuit parameters to minimize said indicator value.

16. The system as recited in claim 15, wherein the program instructions of the computer program further comprise:

selecting said solution of said combinatorial optimization problem outputted by said Gauss-Newton based quantum algorithm as a final solution in response to said solution of said combinatorial optimization problem reaching said correct solution.

17. The system as recited in claim 15, wherein the program instructions of the computer program further comprise:

receiving an estimated inner products of a transformation of a Hamiltonian performed by a quantum computing system.

18. The system as recited in claim 17, wherein the program instructions of the computer program further comprise:

updating said circuit parameters using said estimated inner products of said transformation of said Hamiltonian using said Gauss-Newton based quantum algorithm.

19. The system as recited in claim 18, wherein the program instructions of the computer program further comprise:

outputting said solution of said combinatorial optimization problem by said Gauss-Newton based quantum algorithm using said updated circuit parameters.

20. The system as recited in claim 19, wherein said solution of said combinatorial optimization problem comprises a ground state energy level of said Hamiltonian.

* * * * *